May 11, 1948.  W. A. EATON  2,441,264
FLUID PRESSURE CONTROL MECHANISM
Filed April 27, 1945
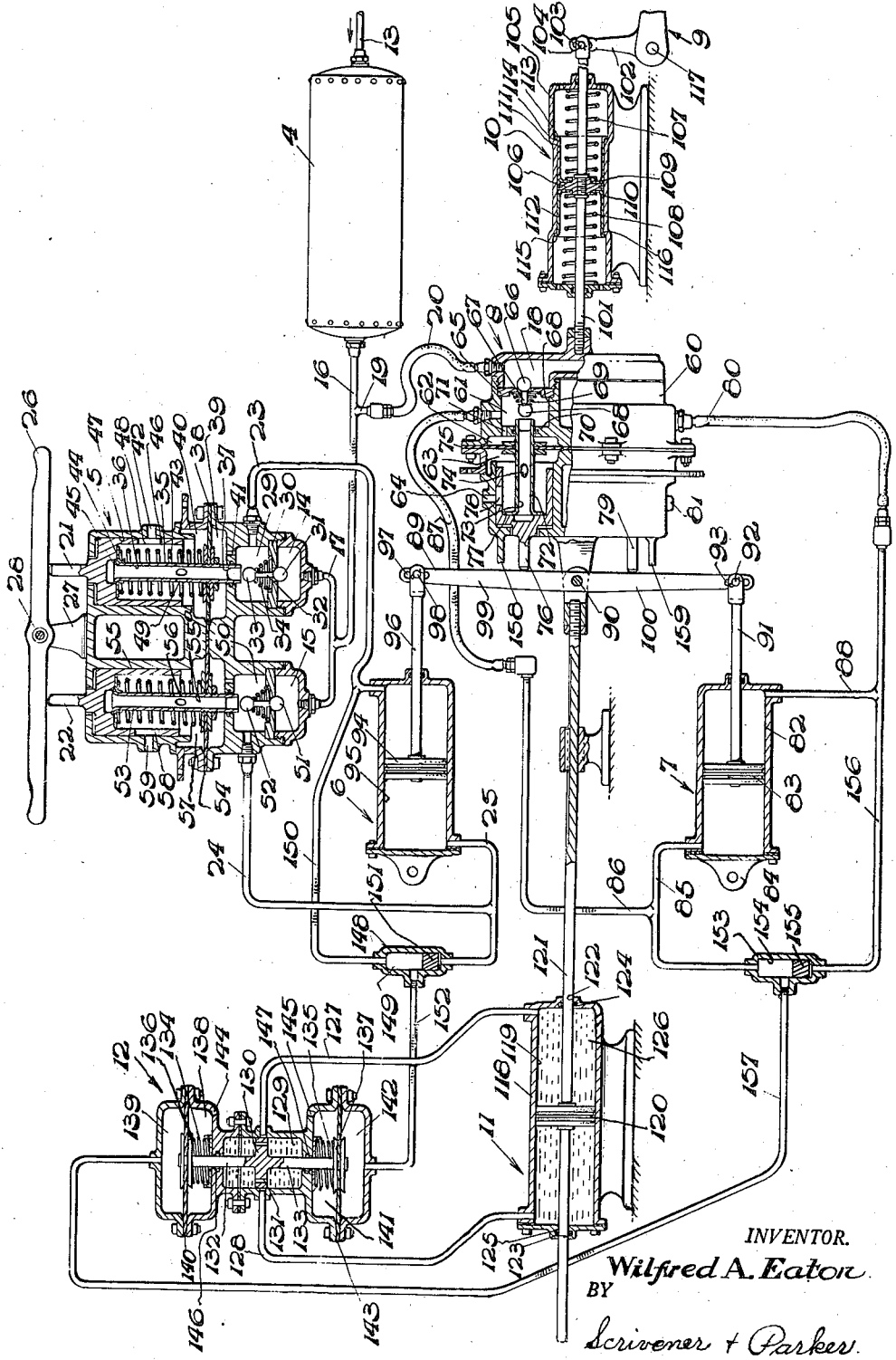
INVENTOR.
Wilfred A. Eaton
BY
Scrivener + Parker
Attorneys Patented May 11, 1948

2,441,264

UNITED STATES PATENT OFFICE 2,441,264

FLUID PRESSURE CONTROL MECHANISM

Wilfred A. Eaton, Elyria, Ohio, assignor to Bendix-Westinghouse Automotive Air Brake Company, Elyria, Ohio, a corporation of Delaware Application April 27, 1945, Serial No. 590,673

10 Claims. (Cl. 121—40)

This invention relates in general to power means for controlling the operation of a remotely positioned device, and more particularly to fluid pressure control mechanism for controlling the operation of a remotely positioned rudder or other device on a vehicle such as a boat or airplane.

One of the objects of the present invention is to provide power operated means for effecting a graduating control of the movement of a remotely positioned rudder or device.

Another object of the invention is to provide novel locking means for insuring maintenance of the device in any desired position regardless of any outside force applied to the device.

Yet another object of the invention is to provide, in a mechanism of the above type, locking means for the device so constituted as to be controlled by variations in the degree of power supplied to various portions of the mechanism.

A still further object of the invention is to provide, in connection with a power operated mechanism wherein a compressible fluid is utilized as the power medium, means controlled by the application of the compressible medium to the mechanism for positively effecting locking of the device in any desired position.

These and other desirable objects and features of the invention will be readily apparent to those skilled in the art when considered in the light of the following description, but it is to be expressly understood that the description is not to be taken as limiting the invention, reference being had for this purpose to the appended claims.

In the drawing, the single figure illustrates diagrammatically, and partially in section, a fluid pressure control mechanism constructed in accordance with the principles of the present invention.

Referring to the drawing, the mechanism includes in general, a fluid pressure reservoir 4, an operator's control valve mechanism 5, a pair of double acting actuators or cylinders 6 and 7, control valve mechnism 8, a remotely positioned rudder or device to be actuated 9, a mechanism 10, adapted to normally maintain the device 9 in neutral position, a hydraulic locking device or cylinder 11, to be more fully described hereinafter, and a hydraulic control valve mechanism 12 adapted to control the action of the hydraulic locking device 11.

The reservoir 4 is adapted to receive fluid pressure from a compressor, not shown, through a conduit 13, and is adapted to supply fluid pressure to inlet chambers 14 and 15 of the operator's control valve mechanism 5 through conduits 16 and 17, and to supply fluid pressure to an inlet chamber 18 provided in the control valve mechanism 8 through a conduit 19 and a flexible conduit or hose 20. The valve mechanism 5, to be described hereinafter in more detail, is provided with valve operating plungers 21 and 22, and outlet conduits 23 and 24, the conduit 23 being connected with the right end of the cylinder 6, and the conduit 24 being connected with the left end of the cylinder through a conduit 25. A control or rudder bar 26 is pivotally mounted on a bracket 27 on the valve 5 by means of a pivot pin 28, rotation of the bar about the pin serving to selectively depress the plunger 21 or the plunger 22. The valve mechanism 5 is of the duplex type having a pair of self-lapping valves operated respectively by the plungers 21 and 22, and it will be understood that on operation of the rudder bar to depress the plunger 21, the corresponding valve mechanism will be operated to supply fluid pressure to the right end of the cylinder 6 at a pressure substantially proportional to the degree of movement of the rudder bar to the position shown, while on movement of the rudder bar in the opposite direction from the position shown, a graduated and controlled pressure will similarly be supplied to the left end of the cylinder.

The actuating mechanism for the device 9 is similar to that set forth in applicant's copending application Ser. No. 590,672, which was filed in the Patent Office on April 27, 1945, and this invention is particularly directed to the locking means shown for controlling the movement of the device 9 under the control of the actuating control mechanism.

With regard to the construction of the valve mechanism 5, it will be noted that the mechanism operated by the plungers 21 and 22 is identical on both sides of the valve, and the right hand portion of the valve will therefore be described. In addition to the inlet chamber 14, the right hand portion is provided with an outlet chamber 29 connected with the outlet conduit 23, and separated from the inlet chamber by means of a ported partition 30. An inlet and exhaust valve assembly comprising an inlet valve 31, a stem 32, and an exhaust valve 33 on the upper end of the stem, is normally maintained in the position shown to prevent communication between the inlet and outlet chambers through the ported partition by means of an inlet valve spring 34 interposed between the exhaust valve and the upper surface of the partition. Operation of the valve assembly is accomplished by means of a valve operating element 35 provided with a bore 36 open at its lower end, and adapted on downward movement to engage the upper surface of the exhaust valve in order to close the lower end of the bore. The element 35 is slidably mounted in a bore 37, and is suitably connected with a pressure responsive member or diaphragm 38 clamped in the housing of the valve mechanism in such a manner as to define a control chamber 39 and an exhaust chamber 40. The control chamber is connected with the outlet chamber 29 by means of a restricted passage 41 in such a manner that the lower surface of the diaphragm is subjected at all times to the pressure in the outlet chamber, the exhaust chamber being connected with atmosphere by means of an exhaust port 42. In order that the valve operating element may be actuated by means of the plunger 21, a graduating spring 43 is interposed between the upper surface of the diaphragm and the lower surface of a washer 44 slidably mounted on the plunger and in engagement with a shoulder 45 formed on the upper end of the plunger, the result being that on downward movement of the plunger, the graduating spring is compressed in such a manner as to impose a downward force on the diaphragm which tends to correspondingly move the element 35 downward into engagement with the exhaust valve 33. Upward movement of the washer 44 on the element 35 is restricted by the flange 45, and it will be understood that with this construction, the graduating spring 43 may be initially installed in such a manner as to be slightly compressed between the upper surface of the diaphragm and the lower surface of the washer 44 in such a manner that initial operation of the plunger 21 will cause the valve mechanism to immediately deliver a pressure corresponding to the degree of precompression of the graduating spring, it being understood that on downward movement of the valve operating element 35 subsequent to closing of the exhaust valve, the inlet valve 31 will be moved to open position to establish communication between inlet chamber 14 and outlet chamber 29.

It is pointed out in this connection, that the operation of the self lapping valve mechanism just described, is substantially identical with that disclosed in the patent to William J. Andres and Roy S. Sanford, No. 2,133,275, issued October 18, 1938, but it is also pointed out that if desired, the graduating spring may be so dimensioned with respect to the position of the diaphragm and the washer 44 as to avoid any preloading or initial precompression of the graduating spring during installation. The lower portion of the plunger 21 is provided with a skirt 46 which is guided by means of a bore 47 formed in the casing of the valve, and communication between the exhaust port 42 and the exhaust chamber 40 is permitted by means of a port 48 formed in the wall of the skirt. Thus the operation of this control valve is substantially identical with that described and disclosed in Fig. 1 of the above referred to patent, and it will be apparent that with the plunger 21 in the position shown, communication between the inlet chamber 14 and the outlet chamber 29 will be prevented, while communication will be permitted between the outlet chamber and atmosphere through the bore 36, ports 49 formed in the wall of the bore, exhaust chamber 40, and ports 48 and 42. On downward movement of the plunger, the valve operating element will be moved downward to first close the exhaust valve and subsequently open the inlet valve in order to admit fluid pressure from the inlet chamber to the outlet chamber, and due to the fact that the outlet chamber is connected with the control chamber 39 through the restricted passage 41, the pressure supplied to the outlet chamber and the control chamber will eventually exert sufficient force on the diaphragm to overcome the force exerted by the graduating spring, whereupon the valve operating element will be moved upward sufficiently to permit the closing of the inlet valve in order to maintain the pressure in the outlet chamber substantially proportional to the degree of movement of the plunger 21 from the position shown. In like manner, the left hand portion of the valve mechanism 5 is provided with an outlet chamber 50, inlet and exhaust valves 51 and 52, a valve operating element 53, a pressure responsive diaphragm 54 connected therewith, and a graduating spring 55 interposed between the plunger 22 and the diaphragm, and since the plunger and valve operating element are constructed in the same manner as those shown in the right hand portion of the valve, it will be understood that with the plunger in the position shown, the outlet chamber will be in communication with atmosphere through a bore 55 formed in the plunger, ports 56 formed in the wall of the bore, an exhaust chamber 57 formed in the casing, a port 58 formed on the lower portion of the plunger 22, and an exhaust port 59 formed in the valve casing. Since the outlet chambers 29 and 50 are connected with the right and left ends of the cylinder 20 through conduit 23 and conduits 24 and 25 respectively, it will be clear that the valve mechanism 5 may be operated by the rudder bar 26 to supply any desired pressure to either end of the cylinder, this pressure being substantially proportional to the degree of movement of the rudder bar from the position shown in either direction depending on which end of the cylinder is to be energized by the operator.

The valve mechanism 8 is similar to the valve mechanism 5 except for the omission of the graduating springs, and is likewise of the duplex type. Since the upper and lower halves of the valve are of identical construction, the upper half only is shown in section and will be described in detail. As shown in the drawing, the valve mechanism is provided with a casing 60, the upper portion of which is provided with an outlet chamber 61, a diaphragm or control chamber 62, and an exhaust chamber 63, the latter being provided with an atmospheric port 64. A ported partition 65 separates the inlet chamber 18 from the outlet chamber 61, communication between these chambers through the partition being normally prevented by means of an inlet valve 66 having a stem 67 and an exhaust valve 68 carried on the left end of the stem, the valve assembly thus formed being normally maintained in the position shown to prevent communication between the inlet and outlet chambers through the ported partition by means of an inlet valve spring 69 interposed between the left surface of the partition and the right side of the exhaust valve. The left end of the outlet chamber 61 is defined by means of a partition 70 formed in the casing, and the outlet chamber communicates with the diaphragm chamber 62 through a restricted passage 71 formed in the above partition. A valve operating element 72 is slidably mounted in the casing as shown, the element being provided with a central bore 73, and being adapted on movement to the right to contact the exhaust valve in order to prevent communication between the outlet chamber and the bore. The bore 73 is adapted to communicate with atmosphere through ports 74, exhaust chamber 63 and an exhaust port 64 formed in the casing. A flexible diaphragm 75 serves to separate the diaphragm and exhaust chambers, the diaphragm being suitably clamped to the casing at its outer periphery, and at its center to the valve operating element. A valve operating plunger 76 is slidably mounted in the casing, and a shoulder 77 formed therein serves to engage the left end of the valve operating element. A port 78 is formed in the plunger as shown in order to insure communication at all times between the exhaust chamber and the exhaust port 64. Thus with the valves in the position shown, communication is prevented between the inlet and outlet chambers and is permitted between the outlet chamber and atmosphere, thus the bore 73, the ports 74, the exhaust chamber 63, the ports 78 and the exhaust chamber 63, the ports 78 and the exhaust port 64, while on movement of the valve operating element to the right, the right end of the bore 73 is closed by the exhaust valve, and the inlet valve 66 is subsequently moved to open position in order to permit communication between inlet chamber 18 and outlet chamber 61. Since the diaphragm is subjected at all times to the pressure in the outlet chamber through the restricted passage 71, it is apparent that this pressure will act on the diaphragm to move the valve operating element to the left as soon as the diaphragm force is sufficient to move the element against the force exerted to the right thereon. The lower half of the valve mechanism is provided with a similar valve operating plunger 79, the lower portion of the mechanism being adapted with the plunger 79 in the position shown, to prevent communication between the inlet chamber 18 and a flexible outlet conduit 80, and to permit communication between the conduit 80 and an exhaust port 81 formed in the casing of the valve mechanism.

The valve mechanism 8 is arranged to control the supply of fluid pressure to the fluid motor 7, the latter motor including a casing 82 having a piston 83 slidably mounted therein. The casing is pivotally mounted on the structure of the airplane by means of a bracket 84, and the left end of the casing 82 is connected with the upper outlet chamber 61 of the valve mechanism 8 by means of a conduit 85, a conduit 86, and a flexible conduit 87 connected with the outlet chamber. In like manner, the right end of the casing is connected with the lower outlet conduit 80 by means of a conduit 88. It will be understood that on movement of the plunger 76 to the right, fluid pressure will be supplied to the left end of the motor 7 from the reservoir through conduit 16, conduit 19, conduit 20, inlet chamber 18, ported partition 65, outlet chamber 61, and conduits 87, 86 and 85, while on movement of the plunger 79 to the right, the valve mechanism will serve to supply fluid pressure from the reservoir to the right end of the motor through conduits 16, 19 and 20, the lower portion of the valve mechanism 8, and conduits 80 and 88, while with the parts in the position shown, both sides of the motor 7 are connected to atmosphere through the passages heretofore described.

In order that the fluid actuators or motors 6 and 7 may be effective to control the actuation of the device 9, a lever 89 is pivotally mounted on the casing of the valve 8 by means of a pivot pin 90, the lower end of the lever being connected to the piston 83 and a piston rod 91 connected thereto, by means of a pivot pin 92 and a slot 93 formed in the lever, the upper end of the lever being connected with a piston 94 slidably mounted in a cylinder 95 of the fluid motor 6 by means of a piston rod 96 connected with the piston and connected with a slot 97 formed in the lever by means of a pivot pin 98. In the particular embodiment of the invention shown, the pistons 83 and 94 may be so designed as to have equal areas, and the lever 89 is divided into lever arms 99 and 100 above and below the pivot pin 90 respectively, these lever arms being preferably of equal length. Consequently, when equal pressures are applied to the pistons 83 and 95 to move them in the same direction, the forces acting on the lever arms 99 and 100 to rotate the lever 89 about the pivot pin 90 will be balanced, and no rotation of the lever will occur under this condition of operation. In order that the power delivered to the fluid motors 6 and 7 may be effective to move the device 9, a connecting rod 101 is threadedly received by the casing of the valve 8 as indicated, and is connected at its right end to a lever arm 102 carried on the device by means of a slot 103 and a pivot pin 104. Means is also provided to normally maintain the device 9 in a neutral position, this means being included in the neutralizing mechanism 10, and comprising a casing 105 having a collar 106 slidably mounted therein and connected with the rod 101 for movement therewith. Neutralizing springs 107 and 108 are interposed between the left and right ends of the casing and flanges 109 and 110 of spring cages 111 and 112 slidably mounted in the casing. The cage 111 is provided with a flange 113 adapted to engage a shoulder 114 formed in the casing to prevent further movement of the spring cage to the left, while movement of the spring cage 112 to the right beyond the position shown is prevented by means of a flange 115 formed on the cage and adapted to engage a flange 116 formed on the casing. The springs 107 and 108 are preferably installed in a precompressed or preloaded condition, in order that a predetermined force may be required to move the collar 106 and the rod 101 in either direction from the neutral position shown to effect movement of the device 9.

In the event the operator is desirious in turning the rudder in a clockwise direction, for example, the rudder bar 26 may be rotated in a counterclockwise direction to depress the plunger 22, whereupon the graduating spring 55 is compressed to move the diaphragm and the attached valve operating element 53 downward to close the exhaust valve and open the inlet valve 51 in order to permit fluid pressure to be supplied from the reservoir 4 to the left end of the fluid motor 6 through the passages heretofore described. When this occurs, the piston 94 and the rod 96 move to the right, tending to rotate the lever 89 about the pivot pin 90 which causes a slight movement of parts 83 and 91 toward the left. This action moves the plunger 76 to the right to close the exhaust valve 68 and open the inlet valve 66, whereupon fluid pressure is supplied to the left end of the motor 7 through means already described. As the pressure increases in the left end of the motor 7, the piston 83 and the rod 91 are moved to the right, thus tending to rotate the lever 89 in a counterclockwise direction about the pivot pin 98 to move the casing of valve 8 to the right, and to eventually permit movement of the plunger 76 to the left with respect to the casing of the valve 8 sufficiently to permit closing of the inlet valve 66. When this valve closes, the valve mechanism is in lapped position, and a pressure is maintained in the left end of the motor 7 which is substantially equal to that obtaining in the left end of the motor 6, due to the balancing action inserted by the lever 89. It is also pointed out that during the above operation, force is exerted on the casing of the valve 8 through the pivot pin 90 by the action of the motors 6 and 7 to move the entire valve assembly to the right, and since the latter is connected with the lever 102 by means of the rod 101, the device 9, which is pivotally mounted for rotation on a shaft 117, is rotated in a clockwise direction. In like manner, on rotation of the rudder bar 26 in the reverse direction, the plunger 21 is depressed, and fluid pressure is supplied to the right end of the motor 6, whereupon the lower portion of the valve mechanism 8 is operated to supply fluid pressure to the right end of the motor 7 in the manner above described, and through the previously described passages. Thus when the valve mechanism 8 has been moved to lapped position due to the balancing of the pressures in the motors 6 and 7, due to the balancing action of the lever 89, it will be apparent that the application of an outside force to the device 9 tending to move the latter in one direction or the other will move the entire mechanism comprising the connecting rod 101, the valve mechanism 8, the lever 89, and piston rods 96 and 91 as well as pistons 94 and 83 in a corresponding direction, without in any way operating the mechanism of the valve 8 to vary the pressure conditions existing in the motor 7, this being particularly true in the event the fluid utilized is of a compressible type such as compressed air. The advantages of this type of construction have already been pointed out in the copending application, above referred to, but it is also pointed out that, particularly in the event a compressible medium is used as above stated, it is desirable to provide means for locking the device 9 in any position to which it may have been moved by the operation of the control mechanism hereinbefore described.

In order that the above desirable result may be readily accomplished, a double acting hydraulic device 11 is provided comprising a casing 118 having a cylinder 119 and a piston 120 slidably mounted therein and mounted on a piston rod 121 slidably mounted in bores 122 and 123 formed in the right and left end walls of the casing respectively. Leakage at these points is prevented by means of suitable seals 124 and 125, and means are provided for bypassing a hydraulic fluid 126, with which the hydraulic device is filled, from one side of the device to the other through a conduit 127 connected to the right end of the device, a conduit 128 connected to the left end of the device, and a chamber 129 formed in the hydraulic control device 12, and likewise completely filled with hydraulic fluid, the above chamber serving to inter-connect the conduits 127 and 128. A hydraulic control valve 130 is slidably mounted in the chamber 129, this valve being in the form of a piston adapted in the position shown to prevent communication between conduits 127 and 128, and being provided with ports 131 therethrough in order to permit the flow of hydraulic fluid from one side of the valve to another on movement of the latter in either direction from the position shown. The valve is provided with upward and downwardly extending stem portions 132 and 133, and the valve is normally maintained in the closed position shown by means of springs 134 and 135 interposed between the casing and flanges 136 and 137 formed on the upper and lower ends respectively of the stem portions 132 and 133. The upper end of the control device 12 is divided into atmospheric and control chambers 138 and 139 by means of a flexible diaphragm 140 clamped in the casing and attached at its center to the valve stem portion 132, the lower end of the casing being similarly divided into atmospheric and control chambers 141 and 142 by means of a diaphragm 143 clamped in the casing and attached at its center to the lower end of the valve stem portion 133. The atmospheric chambers 138 and 149 are provided with atmospheric ports 144 and 145 and leakage between the chamber 129 and the atmospheric chambers is prevented by suitable seals 146 and 147, associated with the upper and lower valve stem portions as shown.

In order that the mechanism 12 may be effective to control the bypassing of hydraulic fluid from one side of the hydraulic locking device 11 to the other side thereof when it is desired to effect movement of the device 9 to a new position, the system is so constructed as to subject the control chamber 139 at all times to the pressure supplied to the fluid motor 7, while the control chamber 142 is subjected at all times to the pressure supplied to the fluid motor 6. To this end, a double check valve 148, of conventional design, is provided with a bore 149 connected at its upper end with the right end of the motor 6 through a conduit 150 and a portion of conduit 23, and at its lower end with conduit 25, which in turn is connected to the left end of the motor 6. A piston 151 is slidably mounted in the bore 149, and on application of fluid pressure to the bore 149 through the conduit 150, the piston 151 moves downward to prevent communication between the bore 149 and the conduit 25, the reverse action taking place whenever fluid pressure is admitted to the bore from the conduit 25. Thus the piston 151 is always moved to the end of the bore receiving the lowest pressure, and the center portion of the bore is connected with the control chamber 142 of the mechanism 12 by means of a conduit 152 as shown. In like manner, a double check valve 153 having a bore 154 and a piston 155 slidably mounted therein is provided, the upper end of the bore being connected at all times with the left end of the motor 7 through conduit 85, and the lower end being connected with the right end of the motor through a conduit 156 and the conduit 88.

Since the cylinder 119, the conduits 127 and 128, and the chamber 129 are completely filled with hydraulic fluid, it will be understood that with the parts in the position shown on the drawing, it will be impossible for movement of the device 9 to occur unless hydraulic fluid is by-passed from one side of the cylinder to another through the conduits 127 and 128 and through the chamber 129, but this action is prevented by the valve 130 in the position shown, and consequently the device 9 is locked against movement by virtue of the fact that it is connected with the piston 120 in the hydraulic locking device by means of the pin 104, the rod 101, the valve mechanism 8 and the piston rod 121. If it is desired to move the device 9 in the clockwise direction, for example, the rudder bar 26 is moved in a counterclockwise direction, operating the valve mechanism to supply fluid pressure to the left end of the motor 6 in order to move the piston 94 to the right end to rotate the lever 89 in a clockwise direction about the pivot pin 90 to operate the upper portion of the valve mechanism 8 to supply fluid pressure to the left end of the motor 7. Since it is impossible for the valve mechanism 8 to supply fluid pressure to the left end of the motor 7 until movement of the piston 94 has occurred to effect operation of the valve mechanism 8, the pressure in the left end of the motor 6 will start to increase before a similar increase in pressure occurs in the left end of the motor 7. The pressure supplied to the left end of the motor 6 is transmitted to the control chamber 142 of the control mechanism 12 through conduit 24, conduit 25, double check valve 148 and conduit 152, while the pressure supplied to the left end of the member 7 is transmitted to the control chamber 139 through conduit 86, conduit 85, double check valve 153 and a conduit 157 connected between the bore 154 of the double check valve and the control chamber 139. Thus an increase in pressure occurs in chamber 142 prior to a similar increase in the chamber 139, with the result that the upward force exerted by the diaphragm 143 is greater than the downward force exerted by the diaphragm 140, and the valve 130 is moved upward out of register with the upper ends of the conduits 127 and 128, permitting hydraulic fluid to be bypassed from the right end of the cylinder 119 to the left end through the conduits 127 and 128 and chamber 129, and permitting movement of the device 9. As heretofore stated, the pressure eventually increases in the left end of the motor 7, moving the piston 83 to the right in order to move the control valve mechanism 8 to the right and in order to assist in moving the device 9 in a clockwise direction from the position shown. The pressure will eventually reach substantially the same value as the pressure in the left end of the motor 6, at which time, the pressures will likewise equalize in chambers 139 and 142, and the valve 130 will again be moved to the closed position shown by the action of the spring 135, whereupon the hydraulic locking device is again effective to maintain the device 9 in the new position. In the event it is desired to move the device 9 in the opposite direction from the position shown, the rudder bar 26 is moved in a clockwise direction, operating the valve mechanism to supply fluid pressure to the right end of the fluid motor 6 and to the control chamber 142 of the mechanism 12 through the double check valve, the piston 151 in this case being moved downward to prevent the flow of fluid pressure into the left end of the motor 6 through the conduit 25. The pressure thus supplied to the chamber 142 again moves the valve 130 upward to permit hydraulic fluid to be bypassed from the left end of the hydraulic locking cylinder 119 to the right end thereof, and subsequent operation of the valve mechanism 8 by the rocking of the lever 89 will increase the pressure in the right end of the motor 7, and this pressure will be transmitted to the control chamber 139 through conduit 88, 156, double check valve 153 and conduit 157, thus equalizing the pressures in the control chambers 142 and 139, and permitting the valve 130 to again be turned to closed position by the action of the spring 135. Under these circumstances, the device 9 will again be locked in position by the action of the hydraulic locking device, and if the rudder bar 26 is now moved slightly in a counterclockwise direction to operate the valve mechanism 5 to release fluid pressure from the right end of the motor 6, this decrease in pressure will immediately be reflected in the control chamber 142, and due to the fact that the pressure in the right end of the motor 7 and in the control chamber 139 will be maintained at its previous value until the valve mechanism 8 is operated by the piston 94 and the lever 89 to release fluid pressure from the right end of the motor 7, the drop in pressure in the control chamber 142 will permit the diaphragm 140 to move the valve 130 downward to establish communication between conduits 127 and 128, and since under this condition of operation, the spring 108 in the device 10 has been compressed, and tends to move the collar 109 to the right toward neutral position, such movement to the right will cause hydraulic fluid to be bypassed from the right end of the cylinder 119 to the left end through the conduits 127 and the chamber 129, this bypassing action continuing until the pressures in the cylinders and in the control chambers are again substantially equal, whereupon the valve 130 will be again returned to closed position by the action of the spring 134. It is also desirable to insure operation of the device 9 in the event of failure of the fluid pressure supplied to the fluid motor 7, and to this end, stops 158 and 159 are provided on the casing of the valve mechanism 8 for the purpose of limiting rotation of the lever 89 in either direction about the pivot pin 90. In the event of failure of the fluid pressure supplied to the motor 7, the motor will be ineffective to oppose rotation of the lever 89 by the action of the motor 6, but it will be understood that as soon as the lever 89 is rotated to abut the stop 158 or the stop 159 as the case may be, the motor 6 will be effective to move the entire valve mechanism bodily in one direction or the other with consequent corresponding movement of the device 9 about the shaft 117. It is also pointed out that under this type of operation, the control mechanism 12 will be operated only by fluid pressure from the fluid motor 6, the application of fluid pressure to either end of the motor 6 resulting in an immediate increase in pressure in the control chamber 142 and consequently opening of the valve 130 to permit the bypassing of hydraulic fluid from one side of the cylinder 119 to the other. Since there is no build-up of pressure in the motor 7 or in the control chamber 139 under this type of operation, the valve 130 will remain open whenever fluid pressure is supplied to the motor 6, and the latter will be effective to operate the device 9 in a direction determined by the direction of movement of the rudder bar 26.

Although the mechanism has been illustrated and described as comprising fluid motors having pressure responsive members of equal areas connected with lever arms 99 and 100 of equal length, it will be understood by those skilled in the art that lapping of the valve mechanism 8 will be effected whenever the moments on the lever 89 about the pivot pin 90 are substantially equal and opposite, regardless of the pressures in actuators 6 and 7, and that with the length of lever arms 99 and 100 of equal length, the area of the piston 94 may be made smaller than the area of piston 83, for example, in which case the moments about the pivot pin will equalize with the pressure in motor 6 greater than that in motor 7. In this event, it is contemplated that the area of diaphragm 143 will be correspondingly reduced with respect to that of diaphragm 140, insuring maintenance of the valve 130 in the position shown when the pressures in motors 6 and 7 are so adjusted as to equalizing of the moments about the pin 90, and that in any case, the areas of the diaphragms 140 and 143 will be so chosen as to insure the imposing of equal and opposite forces on the valve 130 when the pressures in the motors 6 and 7 are such that the moments on the lever 89 are equal and opposite. In like manner, pressure responsive members in the motors 6 and 7 having equal areas may be connected to lever arms of unequal length on either side of the pivot pin 90, and the relative areas of the diaphragms 140 and 143 correspondingly adjusted to insure positioning of the valve 130 as shown when the valve mechanism 8 is lapped by the operation of the lever 89 actuated by motors 6 and 7.

There has thus been provided in connection with a control mechanism of the type hereinbefore described, novel locking means controlled entirely by variations in the pressure of fluid supplied to the motors or actuators 6 and 7 for permitting or preventing movement of the device 9, and for definitely preventing such movement by outside forces when the moments acting on the lever 89 are substantially equalized and the valves of the control valve mechanism 8 are in lapped position.

While the mechanism shown in the drawing has been described in considerable detail, it will be understood that numerous changes may be made in the construction without departing in any manner from the spirit of the invention, and that the invention is not limited to the forms shown but may receive a variety of mechanical expressions as will readily appear to those skilled in the art. Reference will, therefore, be had to the appended claims for a definition of the limits of the invention.

What is claimed is:

1. In a power-operated control mechanism of the type having a device to be actuated, a pair of power actuators for actuating the device, power control means for controlling the supply of power to one of the actuators, power control means controlled by the operation of said one actuator for controlling the supply of power to the other of said actuators, and connecting means for connecting said actuators and device and for operating the second named power control means, locking means for controlling the movement of said device in accordance with variations in the degree of power supplied to said actuators including a hydraulic device having a pressure responsive member subjected to a column of hydraulic fluid and connected with the first named device, means for controlling the movement of said column of hydraulic fluid by said pressure responsive member, and means responsive to the power supplied to said actuators for controlling the operation of the last named controlling means.

2. In a power control mechanism of the type having a device to be actuated, a pair of power actuators for actuating the device, power control means for controlling the supply of power to one of the actuators, power control means controlled by the operation of said one actuator for controlling the supply of power to the other of said actuators, and connecting means for connecting said actuators and device and for operating the second named power control means, locking means for controlling the movement of said device in accordance with the degree of power supplied to each of said actuators including a double acting hydraulic device having a pressure responsive member connected with the first named device, means for by-passing hydraulic fluid from one side of the pressure responsive member to the other, and means responsive to the power supplied to both said actuators for controlling the flow of hydraulic fluid through said by-passing means.

3. In a power control mechanism of the type having a device to be actuated, a pair of power actuators for actuating the device, power control means for controlling the supply of power to one of the actuators, power control means controlled by the operation of said one actuator for controlling the supply of power to the other of said actuators, and connecting means for connecting said actuators and device and for operating the second named power control means, locking means for controlling the movement of said device in accordance with the degree of power supplied to each of said actuators including a double acting hydraulic device having a pressure responsive member connected with the first named device, means for by-passing hydraulic fluid from one side of said pressure responsive member to the other, means for normally preventing the flow of hydraulic fluid through said by-passing means, and means responsive to the power supplied to each of the actuators for operating said flow preventing means to permit the flow of hydraulic fluid through said by-passing means when the ratio of the degree of power supplied to said actuators varies from a predetermined value.

4. In a power control mechanism of the type having a device to be actuated, a pair of power actuators for actuating the device, power control means for controlling the supply of power to one of the actuators, power control means controlled by the operation of said one actuator for controlling the supply of power to the other of said actuators, and connecting means for connecting said actuators and device and for operating the second named power control means, locking means for controlling the movement of said device in accordance with the degree of power supplied to each of said actuators including a double acting hydraulic device having a pressure responsive member connected with the first named device, means for by-passing hydraulic fluid from one side of said pressure responsive member to the other, a valve for controlling the flow of hydraulic fluid through said by-passing means, means for normally maintaining said valve in closed position, and valve operating means responsive to the power supplied to each of the actuators for moving the valve to open position whenever the ratio of the degree of power supplied to said actuators varies from a predetermined value.

5. In a power control mechanism for the type having a device to be actuated, a pair of power actuators for actuating the device, power control means for controlling the supply of power to one of the actuators, power control means controlled by the operation of said one actuator for controlling the supply of power to the other of said actuators, and connecting means for connecting said actuators and device and for operating the second named power control means, locking means for controlling the movement of said device in accordance with the degree of power supplied to each of said actuators including a double acting hydraulic device having a pressure responsive member connected with the first named device, means for by-passing hydraulic fluid from one side of said pressure responsive member to the other side, a valve for controlling the flow of hydraulic fluid through said by-passing means, means for normally maintaining said valve in closed position, means responsive to the power supplied to said one actuator for moving the valve to open position, means responsive to the power supplied to the other of said actuators for moving the valve to open position, and means for connecting said power responsive means and valve for effecting movement of the valve by either of the power responsive means and for preventing movement of the valve from closed position except when the ratio of the degree of power supplied to said actuators varies from a predetermined value.

6. In a power control mechanism of the type having a device to be actuated, a pair of power actuators for actuating the device, power control means for controlling the supply of power to one of the actuators, power control means controlled by the operation of said one actuator for controlling the supply of power to the other of said actuators, and connecting means for connecting said actuators and device and for operating the second named power control means, locking means for controlling the movement of said device in accordance with the degree of power supplied to each of said actuators including a double acting hydraulic device having a pressure responsive member connected with the first named device, means for by-passing hydraulic fluid from one side of said pressure responsive member to the other side, a valve for controlling the flow of hydraulic fluid through said by-passing means having a closed position and movable in either direction therefrom to an open position, means for normally maintaining said valve in closed position, means responsive to the power supplied to one of said actuators for moving the valve in one direction from closed position, means responsive to the power supplied to the other of said actuators for moving the valve in the opposite direction from closed position, means for connecting said power responsive means in opposed relationship, and a connection between the last named means and said valve.

7. In a power control mechanism of the type having a device to be actuated, a pair of double acting power actuators each having a power responsive member movable in either direction for actuating the device, power control means for selectively controlling the supply of power to one of the actuators to move the power responsive member thereof in one direction or the other, power control means controlled by the first named power responsive member for supplying power to the other of said actuators to effect movement of the power responsive member thereof in the same direction as the power responsive member of said one actuator, and connecting means for connecting the first and second named power responsive members with the device and for operating the second named power control means, locking means for controlling the movement of said device in accordance with the degree of power supplied to each of said actuators including a double acting hydraulic locking device having a pressure responsive member connected with the first named device, means for by-passing hydraulic fluid from one side of the pressure responsive member to the other side, a valve operable in one position to prevent the flow of hydraulic fluid through said by-passing means, means for normally maintaining said valve in said one position, a pair of opposed power responsive means connected with the valve, means for subjecting one of said power responsive means to the power supplied to said one actuator to effect movement of the power responsive member thereof in either direction, and means for subjecting the other of said power responsive means to the power supplied to the other of said actuators to move the power responsive member thereof in either direction.

8. In a power-operated control mechanism of the type having a device to be actuated, a pair of fluid actuators each having a pressure responsive member for actuating the device, valve means for controlling the supply of fluid pressure to one of said actuators, valve means controlled by movement of the first named pressure responsive member for controlling the supply of fluid pressure to the other of said actuators, and connecting means for connecting the first and second named pressure responsive members with the device and for operating the second named valve means, locking means for controlling the movement of said device in accordance with the degree of fluid pressure supplied to said actuators including a double acting hydraulic locking device having a pressure responsive member connected with the first named device, means for by-passing hydraulic fluid from one side to the other of the last named pressure responsive member, a valve operable in one position to prevent the flow of hydraulic fluid through said by-passing means, means for normally maintaining said valve in said one position, and means responsive to the pressure of fluid supplied to each of said actuators for moving said valve from said one position to permit the flow of hydraulic fluid through said by-passing means.

9. In a power-operated control mechanism of the type having a pair of double acting fluid actuators each having a pressure responsive member for actuating the device, valve means for selectively controlling the supply of fluid pressure to either end of one of said actuators to effect movement of the pressure responsive member thereof in one direction or the other, valve means for selectively controlling the supply of fluid pressure to either end of the other of said actuators to effect movement of the pressure responsive member thereof in one direction or the other, and connecting means for connecting said pressure responsive members and device and for operating said second named valve means, locking means for said device including a double acting hydraulic locking device having a pressure responsive member connected with the first named device, means for by-passing hydraulic fluid from one side to the other of said last named pressure responsive member, and valve means controlled by the pressure of fluid supplied to both of said actuators for preventing the flow of hydraulic fluid through said by-passing means except when the pressures supplied to said actuators by the operation of said valve means vary from a predetermined ratio.

10. In a power-operated control mechanism of the type having a pair of double acting fluid actuators each having a pressure responsive member for actuating the device, valve means for selectively controlling the supply of fluid pressure to either end of one of said actuators to effect movement of the pressure responsive member thereof in one direction or the other, valve means for selectively controlling the supply of fluid pressure to either end of the other of said actuators to effect movement of the pressure responsive member thereof in one direction or the other, and connecting means for connecting said pressure responsive members and device and for operating said second named valve means, locking means for said device including a double acting hydraulic locking device having a pressure responsive member connected with the first named device, means for by-passing hydraulic fluid from one side to the other of the last named pressure responsive member, a normally closed valve for preventing the flow of hydraulic fluid through said by-passing means, and means for operating said valve including a pair of pressure responsive members connected with the valve, means for subjecting one of the last named members at all times to the highest pressure supplied to one of said actuators, and means for subjecting the other of said last named members at all times to the highest pressure supplied to the other of said actuators.

WILFRED A. EATON.

REFERENCES CITED

The following references are of record in the file of this patent:

UNITED STATES PATENTS

| Number | Name | Date |
| --- | --- | --- |
| 250,103 | Reynolds | Nov. 29, 1881 |